2 Sheets--Sheet 1.
W. M. TAYLOR.
Improvement in Machine for Cutting and Pulverizing Corn-Stalks.
No. 133,270. Patented Nov. 19, 1872.
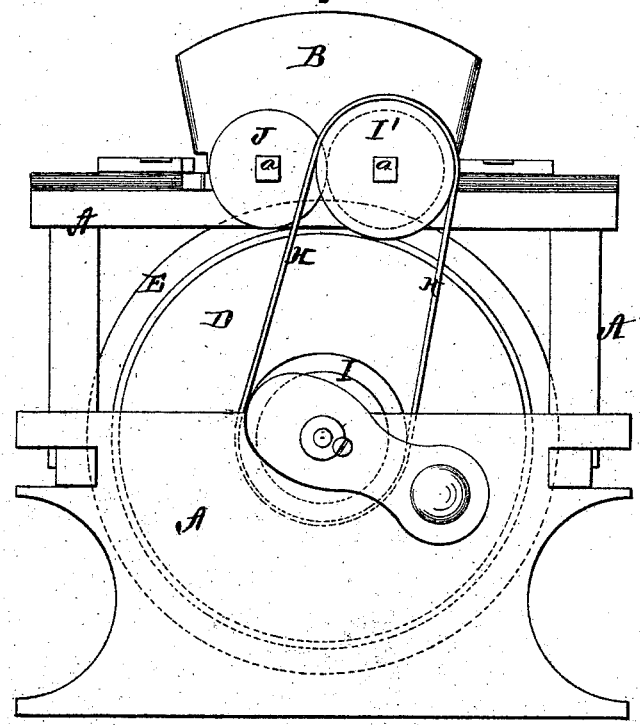
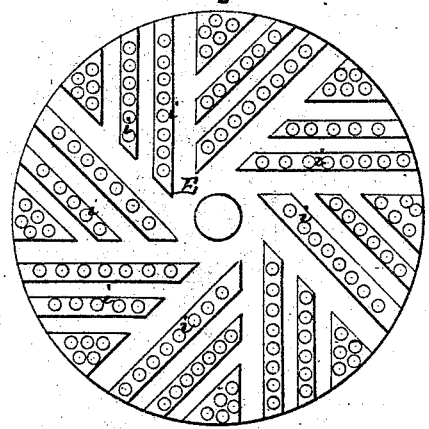
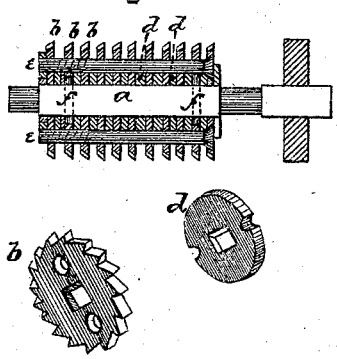

W. M. TAYLOR.
Improvement in Machine for Cutting and Pulverizing Corn-Stalks.

No. 133,270. Patented Nov. 19, 1872.

Witnesses:

Inventor.
W. M. Taylor,
per
Alexander Mason
Attorneys.

UNITED STATES PATENT OFFICE.

WILLIAM M. TAYLOR, OF NEWBURG, OHIO.

IMPROVEMENT IN MACHINES FOR CUTTING AND PULVERIZING CORN-STALKS.

Specification forming part of Letters Patent No. 133,270, dated November 19, 1872.

*To all whom it may concern:*

Be it known that I, WM. M. TAYLOR, of Newburg, in the county of Cuyahoga and in the State of Ohio, have invented certain new and useful Improvements in Machine for Cutting and Pulverizing Corn-Stalks; and do hereby declare that the following is a full, clear, and exact description thereof, reference being had to the accompanying drawing and to the letters of reference marked thereon making a part of this specification.

The nature of my invention consists in the construction and arrangement of a machine for cutting and pulverizing corn-stalks and other articles for feed, as will be hereinafter more fully set forth.

In order to enable others skilled in the art to which my invention appertains to make and use the same, I will now proceed to describe its construction and operation, referring to the annexed drawing, in which—

Figure 2:
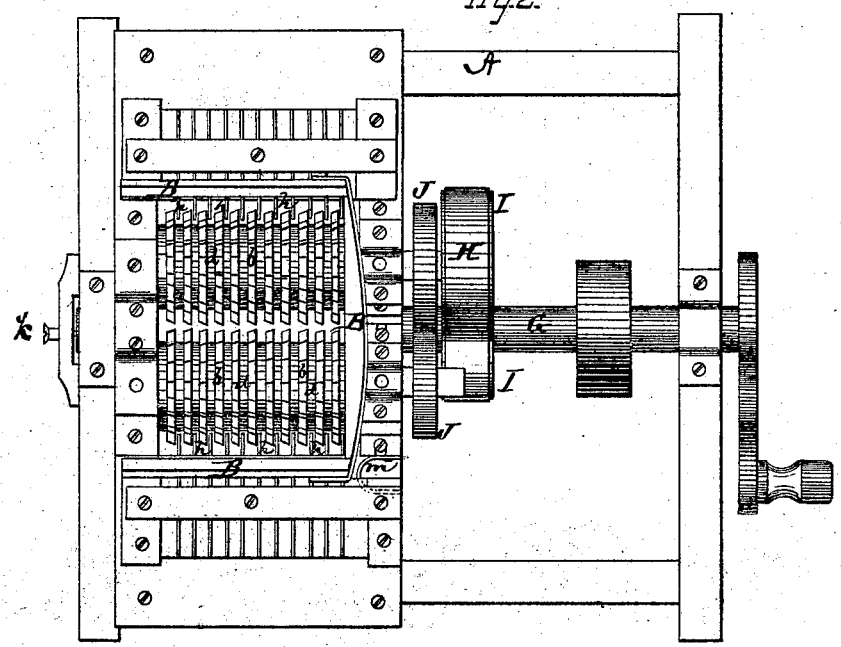
Figure 3:
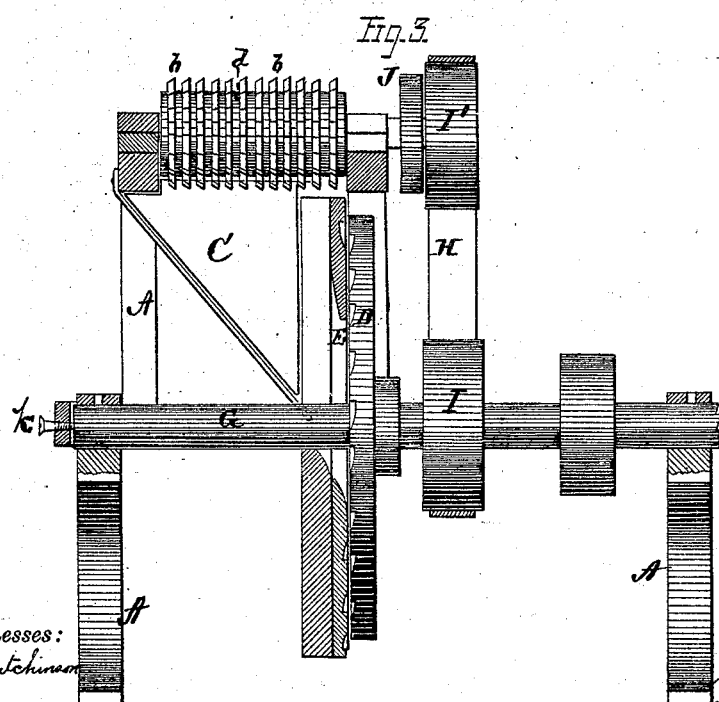

Figure 1 is a side elevation, Fig. 2 a plan view, and Fig. 3 a longitudinal section, of my entire machine. Fig. 4 shows one of the crushing or pulverizing burrs; and Fig. 5, a longitudinal section through one of the saw-cylinders, with detached perspective views of one of the saws and one of the washers.

A represents the frame-work, constructed in any suitable manner to contain the various parts of my machine. The cutting or saw cylinders are each composed of a central horizontal shaft, $a$, with a series of circular saws, $b\ b$, placed upon it, and with washers $d\ d$ between the saws. The saws $b\ b$ are connected and clamped together by two bolts, $e\ e$, which pass through holes in the saws and holes or notches in the washers, and have nuts on their screw ends, as shown. The saws are prevented from shifting on the shaft by means of two pins, $f\ f$, passing through the shaft, and the ends of said pins fitting in the notches filed in two of the saws to receive them. The teeth of the saws $b\ b$ have sharp points, as shown in Fig. 2, so as to more easily penetrate the stalks. The two cutting-cylinders thus constructed are placed side by side, as shown in Fig. 2, and on the outer sides of the cylinders are bearing-bars $h\ h$ having sharp edges $i\ i$ projecting between the saws $b\ b$. As the cylinders revolve outward the corn-stalks rest on the bearing-bars $h$, while the sharp-pointed teeth of the saws cut the stalks, the pieces falling down between said bearing-bars into a hopper or conductor, C, below. This hopper or chute conducts the material through an opening in the stationary crusher E to and between it and the revolving crusher D. These crushers are, on their opposite faces, provided with furrows and divided into parts precisely the same as the millstones of a flour-mill; and, in addition thereto, they have a number of circular or spherical depressions, $i\ i$, as shown in Fig. 4, for the purpose of preventing any material from passing without being crushed or pulverized. The revolving crusher D is secured on a horizontal shaft, G, which passes through the center of the stationary crusher E, and may receive its motion from any convenient power or be revolved by hand. At each end of the shaft G should be a set-screw, $k$, to adjust the crusher to any desired distance apart, according as the feed is wanted coarse or fine. From the shaft G a belt or band, H, connects a pulley, I, on the same with a similar pulley, I', on the end of one of the shafts $a$, and the two shafts $a\ a$ are connected by friction-rollers J J, whereby the motion is communicated from one to the other. These rollers are held together by means of a spring, $m$, operating on one of the boxes in which one of the shafts $a$ rests, as shown in Fig. 2. B represents a bin, arranged on the frame A over the cutting-cylinders and bearing-bars, to place the stalks in to be sawed up.

This machine may be used for cutting and crushing or pulverizing corn-stalks or any other articles to be used as feed. It may also be used for cutting and crushing apples to make cider.

Having thus fully described my invention, what I claim as new, and desire to secure by Letters Patent, is—

1. The cutting-cylinder, consisting of the shaft $a$, saws $b\ b$, washers $d\ d$, bolts $e\ e$, and pins $f\ f$, all constructed and arranged substantially as and for the purposes herein set forth.

2. The combination of the two cutting-cyl inders, $a\ b\ d\ e\ f$, having bars $h\ h$, inclined chute C, and a stationary and a revolving crusher, substantially for the purposes set forth.

3. In combination with two horizontally-placed rotating cutting-cylinders and the inclined chute C, I claim the vertically-placed stationary and revolving crushers E D provided with ridges and depressions $i\ i$ on their faces, substantially as and for the purposes herein set forth.

In testimony that I claim the foregoing I have hereunto set my hand this 25th day of July, 1872.

WM. M. TAYLOR.

Witnesses:
ARCHD. HUTCHISON,
ROBERT MITCHELL.